(12) United States Patent
Chisci et al.

(10) Patent No.: US 12,010,724 B2
(45) Date of Patent: Jun. 11, 2024

(54) STARTING A CHANNEL OCCUPANCY TIME AFTER A DIRECTIONAL LISTEN-BEFORE-TALK

(71) Applicant: QUALCOMM Incorporated, San Diego, CA (US)

(72) Inventors: Giovanni Chisci, San Diego, CA (US); Arumugam Chendamarai Kannan, San Diego, CA (US); Jing Sun, San Diego, CA (US); Vinay Chande, San Diego, CA (US); Xiaoxia Zhang, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/194,961

(22) Filed: Apr. 3, 2023

(65) Prior Publication Data

US 2023/0239927 A1    Jul. 27, 2023

Related U.S. Application Data

(63) Continuation of application No. 17/221,500, filed on Apr. 2, 2021.

(51) Int. Cl.
*H04W 74/0816* (2024.01)
*H04W 16/28* (2009.01)
*H04W 72/044* (2023.01)

(52) U.S. Cl.
CPC ....... *H04W 74/0816* (2013.01); *H04W 16/28* (2013.01); *H04W 72/046* (2013.01)

(58) Field of Classification Search
CPC ............ H04W 74/0816; H04W 16/28; H04W 72/046; H04W 74/0808; H04B 7/0695
See application file for complete search history.

(56) References Cited

U.S. PATENT DOCUMENTS

| | | |
|---|---|---|
| 2017/0238311 A1 | 8/2017 | Hooli et al. |
| 2019/0200389 A1* | 6/2019 | Li ................... H04B 7/0695 |
| 2021/0105815 A1* | 4/2021 | Salem .............. H04W 74/0875 |
| 2021/0392683 A1* | 12/2021 | Awadin ................ H04B 7/088 |
| 2022/0061105 A1* | 2/2022 | He ....................... H04W 74/008 |
| 2022/0095301 A1* | 3/2022 | Oviedo ............ H04W 74/0808 |
| 2022/0124806 A1* | 4/2022 | Hu ..................... H04W 72/1263 |
| 2022/0150917 A1* | 5/2022 | Wang ................... H04W 16/14 |
| 2022/0150922 A1* | 5/2022 | Wu .................... H04W 72/0446 |
| 2022/0210827 A1* | 6/2022 | Wang ................... H04W 16/14 |

(Continued)

FOREIGN PATENT DOCUMENTS

| | | |
|---|---|---|
| WO | 2021034628 A1 | 2/2021 |
| WO | 2022185869 A1 | 9/2022 |

*Primary Examiner* — Ivan O Latorre
(74) *Attorney, Agent, or Firm* — Harrity & Harrity, LLP

(57) ABSTRACT

Various aspects of the present disclosure generally relate to wireless communication. In some aspects, a transmitting node may perform a directional listen-before-talk (LBT) using a sensing beam. The transmitting node may start a channel occupancy time (COT) after the directional LBT based at least in part on one of a COT claiming signal or a time stamp. The transmitting node may perform, to a receiving node, one or more transmissions during the COT using one or more transmit beams that are included in the sensing beam. Numerous other aspects are described.

20 Claims, 15 Drawing Sheets

(56) References Cited

U.S. PATENT DOCUMENTS

| | | | |
|---|---|---|---|
| 2022/0240260 A1 | 7/2022 | Zhou et al. | |
| 2022/0322434 A1* | 10/2022 | Chisci | H04W 74/0816 |
| 2023/0239927 A1* | 7/2023 | Chisci | H04W 74/0808 |
| | | | 370/329 |
| 2023/0254893 A1* | 8/2023 | Shibaike | H04W 74/0808 |
| | | | 370/329 |
| 2023/0413325 A1* | 12/2023 | Li | H04W 74/002 |

* cited by examiner

STARTING A CHANNEL OCCUPANCY TIME AFTER A DIRECTIONAL LISTEN-BEFORE-TALK

RELATED APPLICATION

This application is a continuation of U.S. patent application Ser. No. 17/221,500, filed Apr. 2, 2021, which is incorporated herein by reference in its entirety.

FIELD OF THE DISCLOSURE

Aspects of the present disclosure generally relate to wireless communication and to techniques and apparatuses for starting a channel occupancy time (COT) after a directional listen-before-talk (LBT).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BS s) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a transmitting node for wireless communication includes a memory; and one or more processors, coupled to the memory, configured to: perform a directional LBT using a sensing beam; start a COT after the directional LBT based at least in part on one of a COT claiming signal or a time stamp; and perform, to a receiving node, one or more transmissions during the COT using one or more transmit beams that are included in the sensing beam.

In some aspects, a method of wireless communication performed by a transmitting node includes performing a directional LBT using a sensing beam; starting a COT after the directional LBT based at least in part on one of a COT claiming signal or a time stamp; and performing, to a receiving node, one or more transmissions during the COT using one or more transmit beams that are included in the sensing beam.

In some aspects, a non-transitory computer-readable medium storing a set of instructions for wireless communication includes one or more instructions that, when executed by one or more processors of a transmitting node, cause the transmitting node to: perform a directional LBT using a sensing beam; start a COT after the directional LBT based at least in part on one of a COT claiming signal or a time stamp; and perform, to a receiving node, one or more transmissions during the COT using one or more transmit beams that are included in the sensing beam.

In some aspects, an apparatus for wireless communication includes means for performing a directional LBT using a sensing beam; means for starting a COT after the directional LBT based at least in part on one of a COT claiming signal or a time stamp; and means for performing, to a receiving node, one or more transmissions during the COT using one or more transmit beams that are included in the sensing beam.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
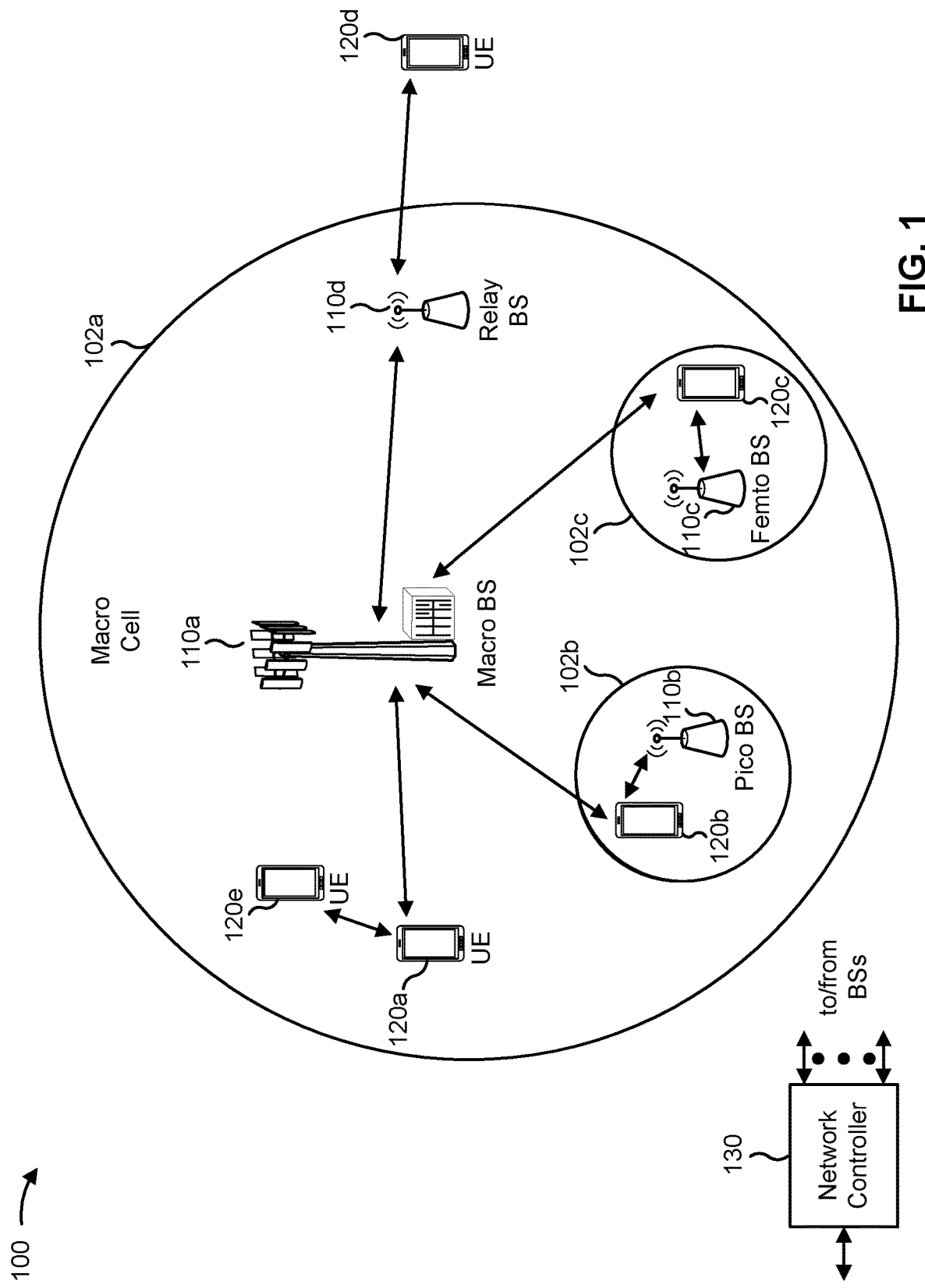
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
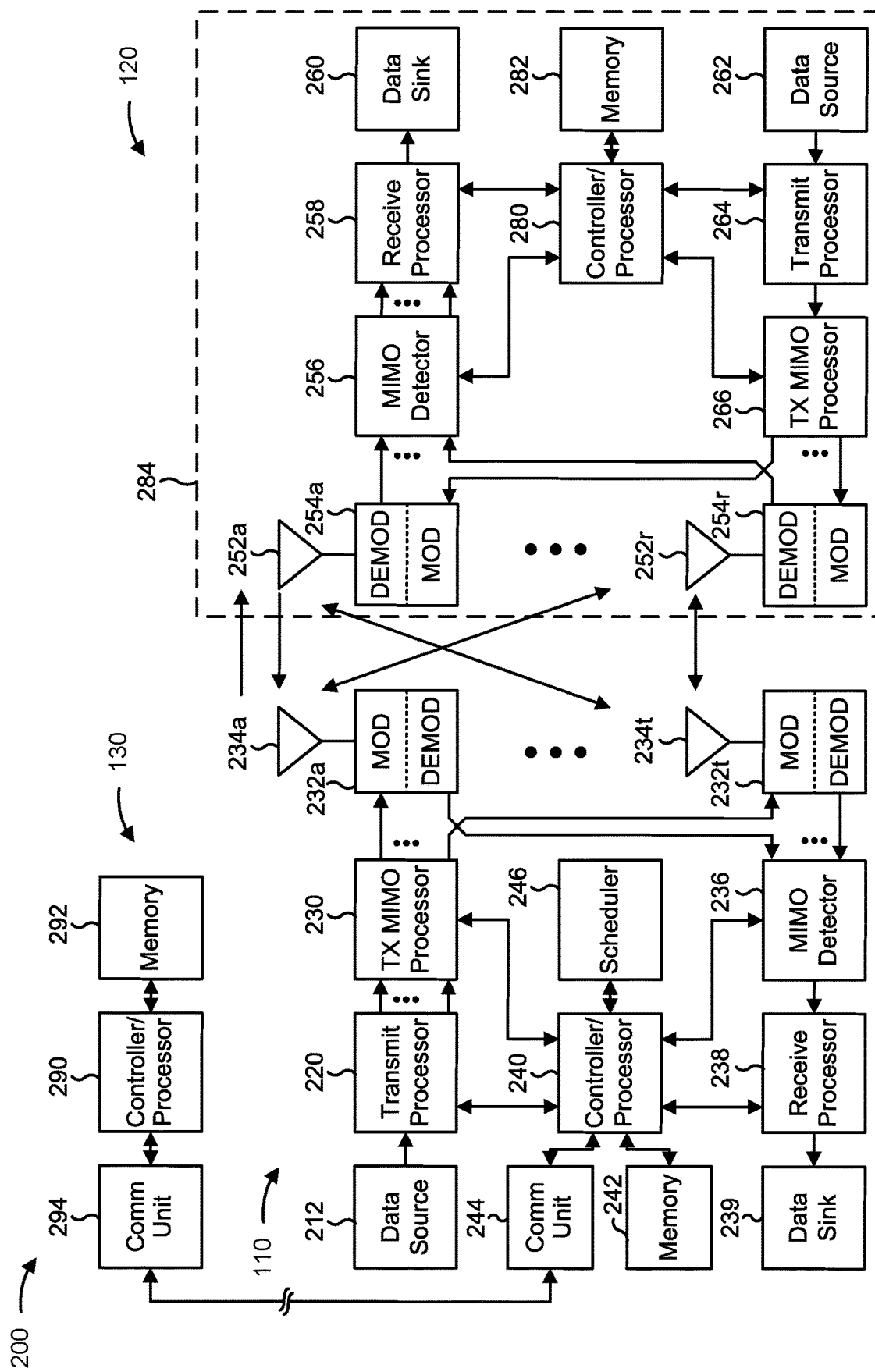
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 7-14).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via a communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 7-14).

Controller/processor 240 of base station 110, controller/processor 280 of UE 120, and/or any other component(s) of FIG. 2 may perform one or more techniques associated with starting a COT after a directional LBT, as described in more detail elsewhere herein. In some aspects, the transmitting node described herein is the base station 110, is included in the base station 110, or includes one or more components of the base station 110 shown in FIG. 2. In some aspects, the transmitting node described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1400 of FIG. 14, and/or other processes as described herein. In some aspects, executing instructions may include running the instructions, converting the instructions, compiling the instructions, and/or interpreting the instructions, among other examples.

In some aspects, a transmitting node (e.g., base station 110 or UE 120) includes means for performing a directional LBT using a sensing beam; means for starting a COT after the directional LBT based at least in part on one of a COT claiming signal or a time stamp; and/or means for performing, to a receiving node, one or more transmissions during the COT using one or more transmit beams that are included in the sensing beam. In some aspects, the means for the transmitting node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the transmitting node to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In a 60 GHz band, an initiating device (e.g., a UE or a base station) may employ LBT to facilitate spectrum sharing. During LBT, before a single transmission or a burst of transmissions on an operating channel, the initiating device that initiates the transmission may perform a CCA procedure in the operating channel. When the initiating device determines, based at least in part on the CCA procedure, that the operating channel is occupied, the initiating device may not transmit in the operating channel. When the initiating device determines, based at least in part on the CCA procedure, that the operating channel is no longer occupied, and the transmission was deferred for a quantity of empty slots defined by the CCA procedure, the initiating device may resume the transmission or enable another UE to transmit on the operating channel.

The initiating device that initiates the transmission may perform the CCA procedure using an energy detection. The operating channel may be considered to be occupied for a slot time of 5 microseconds (µs) when an energy level in the operating channel satisfies an energy detection threshold. The initiating device may observe the operating channel for a duration of a CCA observation time measured by multiple slot times.

The initiating device may initiate the CCA procedure at an end of an operating channel occupied slot time. The initiating device may initiate a deferring transmission when observing that the operating channel is not occupied for a minimum of 8 µs. The transmission deferring may span for a minimum of a random quantity of empty slot periods, where the random quantity may range from 0 to a maximum quantity. The maximum quantity may not be lower than three.

The initiating device that initiates the transmission may use the operating channel for a time period, which may be referred to as a COT. In other words, the initiating device may perform the CCA procedure to initiate the COT. The COT may be less than 5 ms. After passing a CCA check based at least in part on the CCA procedure, the initiating device may share the COT with responding devices. The responding devices may not perform a CCA procedure to share the COT. A length of a time gap between initiating device transmissions and responding device transmissions may not be required to satisfy a threshold. Further, after an expiry of the COT, the initiating device may perform a new CCA procedure.

The energy detection threshold for the CCA procedure may be $-80$ dBm$+10\times\log_{10}$ (Operating Channel Bandwidth (in MHz))$+10\times\log_{10}$(Pmax/Pout), where Pout is an RF output power in terms of an effective, or equivalent, isotropically radiated power (EIRP) in watts, and Pmax is an RF output power limit in terms of an EIRP in watts.

Figure 3:
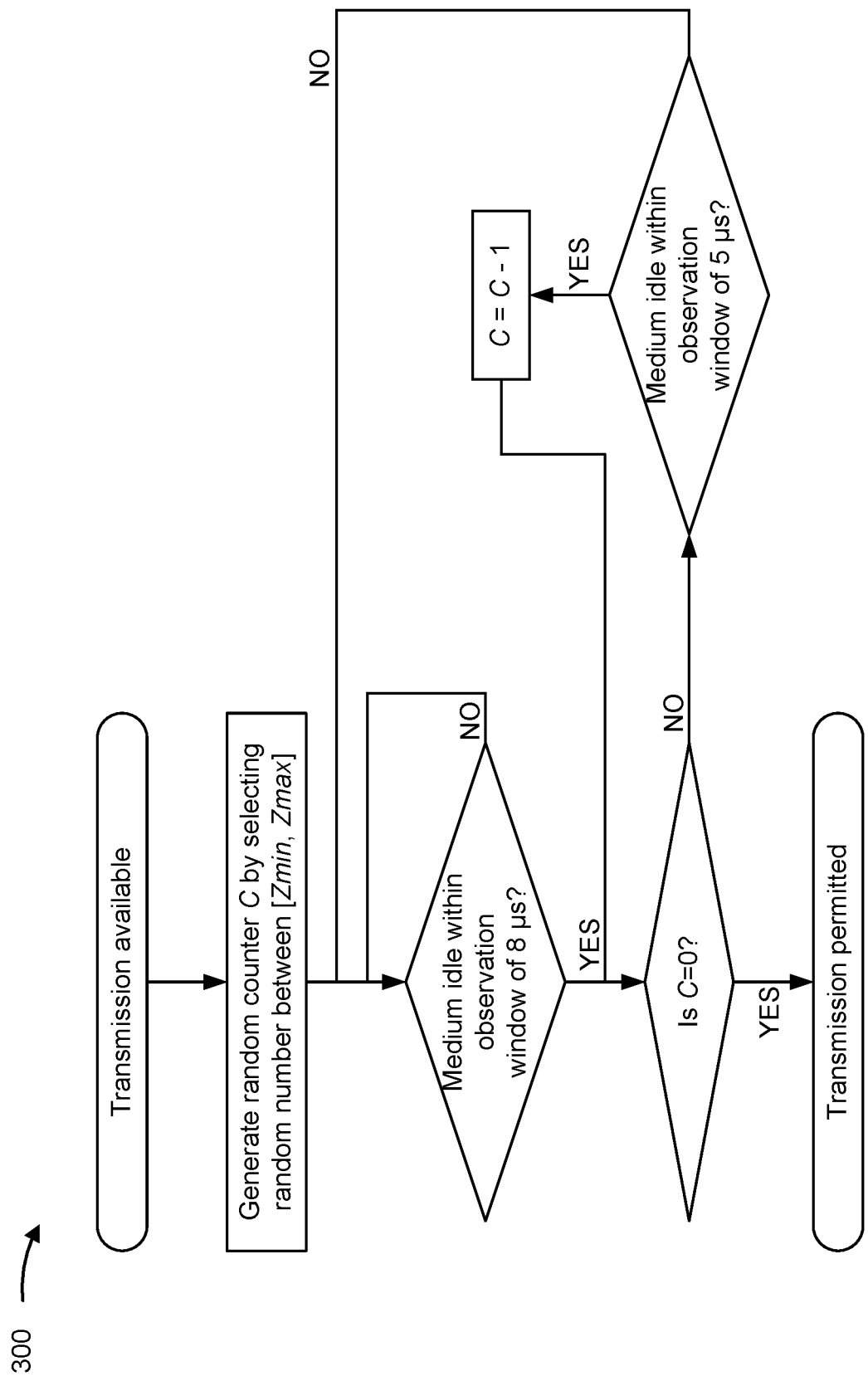
FIG. 3 is a diagram illustrating an example of a clear channel assessment (CCA) procedure, in accordance with the present disclosure.

FIG. 3 is a diagram illustrating an example 300 of a CCA procedure, in accordance with the present disclosure.

As shown in FIG. 3, when a transmission is available, an initiating device may generate a random counter C by drawing a random number between a minimum value (Zmin) and a maximum value (Zmax). The initiating device may determine whether a medium is idle within an observation window of 8 µs. When the medium is idle within the observation window of 8 µs, the initiating device may determine whether the random counter C is equal to zero. When the random counter C is equal to zero, the initiating device may be permitted to perform the transmission. When the random counter C is not equal to zero, the initiating device may determine whether the medium is idle within an observation window of 5 µs. When the medium is idle within the observation window of 5 µs, the random counter C may be equal to C$-1$, and the initiating device may determine again whether the random counter C is equal to zero. When the random counter C becomes equal to zero, the initiating device may be permitted to perform the transmission.

As indicated above, FIG. 3 is provided as an example. Other examples may differ from what is described with regard to FIG. 3.

The LBT may include directional LBT, which may account for directional sensing. Directional LBT may involve a wide sensing beam and several narrower transmit beams. For LBT, an energy detection threshold may be based at least in part on a beamformed sensing beam. For example, for a wide sensing beam versus a narrow sensing beam, the narrow sensing beam may be associated with a higher energy detection threshold due to higher beamforming gain, as compared to the wide sensing beam which may be associated with a lower energy detection threshold.

Figure 4:
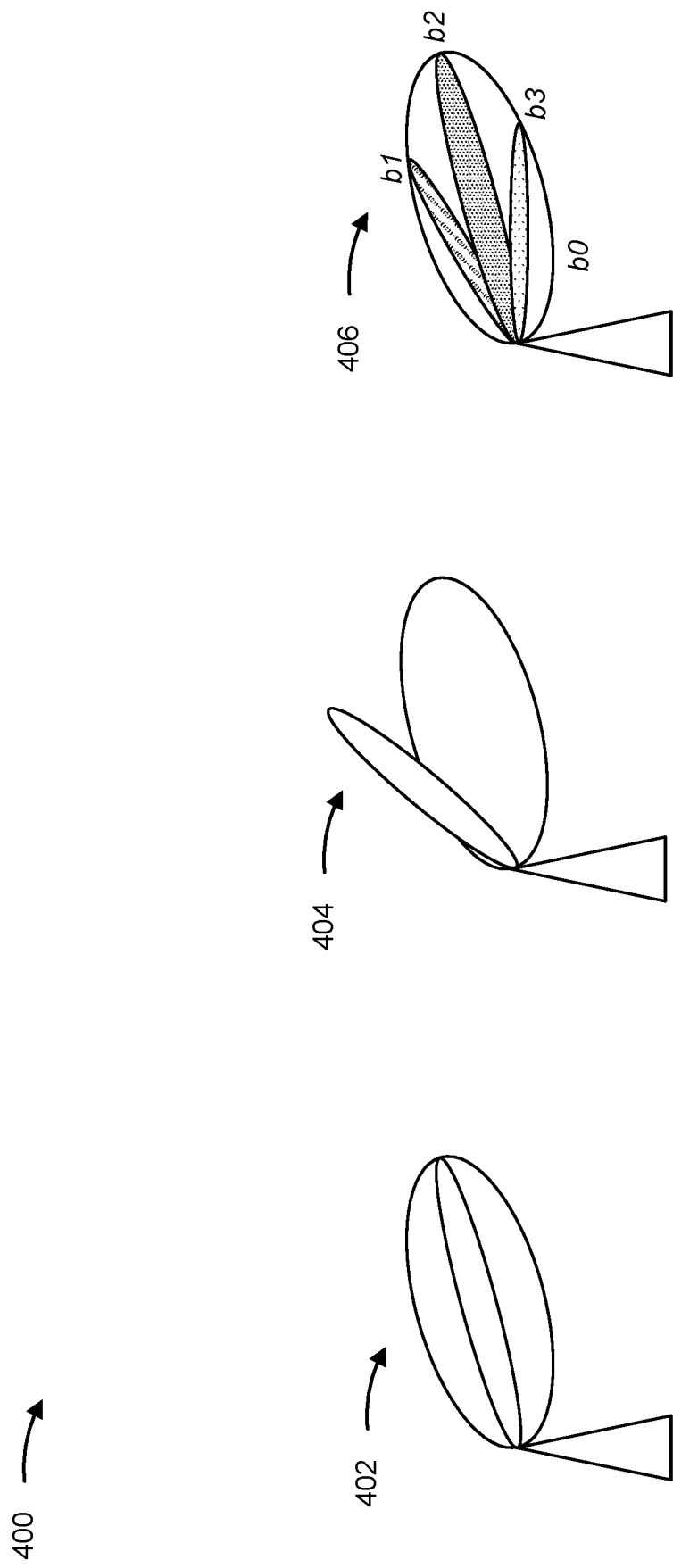
FIG. 4 is a diagram illustrating examples of LBT sensing beams and transmit beams, in accordance with the present disclosure.

FIG. 4 is a diagram illustrating examples 400 of LBT sensing beams and transmit beams, in accordance with the present disclosure.

As shown by reference number 402, a transmit beam may be included in an LBT sensing beam based at least in part on energy considerations. As shown by reference number 404, a transmit beam may not be included in an LBT sensing beam based at least in part on energy considerations. As shown by reference number 406, a transmit beam may be included in an LBT sensing beam based at least in part on quasi-co-location (QCL) considerations. For example, the LBT sensing beam may be represented by $b_0$, and transmit beams $b_1$, $b_2$, and $b_3$ may be included within LBT sensing beam $b_0$ when the transmit beams $b_1$, $b_2$, and $b_3$ derive a QCL from LBT sensing beam $b_0$.

As indicated above, FIG. 4 is provided as an example. Other examples may differ from what is described with regard to FIG. 4.

Figure 5:
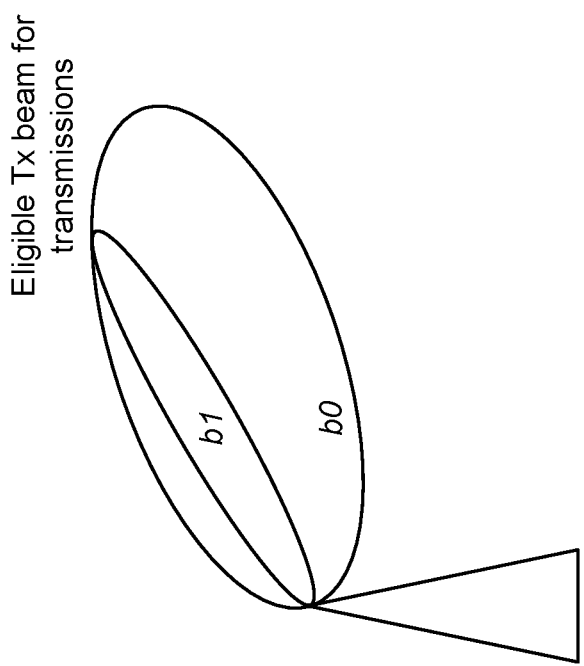
FIG. 5 is a diagram illustrating an example of an eligible transmit beam, in accordance with the present disclosure.

FIG. 5 is a diagram illustrating an example 500 of an eligible transmit beam, in accordance with the present disclosure.

As shown in FIG. 5, given an LBT sensing beam ($b_0$) associated with a wide beam LBT and an energy detection threshold ($EDT_0$), a transmit beam ($b_1$) may be eligible for transmissions during a COT when the transmit beam ($b_1$) is included in the LBT sensing beam ($b_0$), and when a test energy detection threshold ($EDT_1$) for sensing or transmitting on the transmit beam ($b_1$) is greater than or equal to an employed energy detection threshold, such as $EDT_0$ (e.g., $EDT_0 \leq EDT_1$). In this case, the energy detection threshold ($EDT_0$) may be associated with the LBT sensing beam ($b_0$) and the test energy detection threshold ($EDT_1$) may be associated with the transmit beam ($b_1$).

A test energy detection threshold ($EDT_i$) for transmit beam ($b_i$) may be defined as an energy detection threshold that may be used to allow transmissions over the transmit beam ($b_i$) with radiated power ($EIRP_i$) over a bandwidth ($BW_i$) after sensing over the transmit beam ($b_i$).

When a device initiates a transmission on a new beam that was not originally considered during an LBT, the device may determine whether the new beam is eligible for transmissions during a COT based at least in part on the new beam being included in a sensing beam, and based at least in part on a test energy threshold associated with the new beam not being greater than a current energy detection threshold.

As indicated above, FIG. 5 is provided as an example. Other examples may differ from what is described with regard to FIG. 5.

Figure 6:
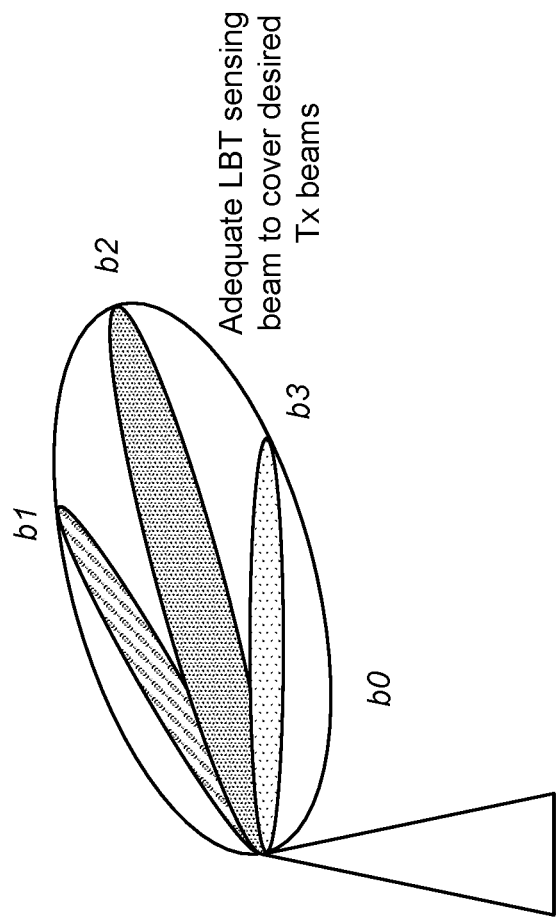
FIG. 6 is a diagram illustrating an example of an adequate LBT for transmitting on a set of transmit beams, in accordance with the present disclosure.

FIG. 6 is a diagram illustrating an example 600 of an adequate LBT for transmitting on a set of transmit beams, in accordance with the present disclosure.

As shown in FIG. 6, given a set of desired transmit beams (e.g., $b_1$, $b_2$, and $b_3$) to be covered by an LBT, the LBT may be adequate to cover the set of desired transmit beams over a COT based at least in part on a spatial existence of an LBT sensing beam ($b_0$) and an energy detection threshold ($EDT_0$). For example, the LBT may be an adequate LBT when the LBT sensing beam ($b_0$) includes the set of desired transmit beams (e.g., $b_1$, $b_2$, and $b_3$), and when the energy detection threshold ($EDT_0$) satisfies the following: $EDT_0 \leq \min_i\{EDT_i\}$, where $EDT_i$ is a test energy detection threshold assuming a same sensing or transmitting beam for transmit beam ($b_i$). In this case, the energy detection threshold ($EDT_0$) may be associated with the LBT sensing beam ($b_0$) and the energy detection threshold ($EDT_i$) may be associated with a desired transmit beam ($b_i$), such as transmit beam $b_1$, $b_2$, or $b_3$. Further, the energy detection threshold ($EDT_0$) may be less than or equal to a minimum of test energy detection thresholds associated with the desired transmit beams.

When a device is determining an LBT sensing beam to be used to allow transmissions on several transmit beams, the device may determine whether the LBT sensing beam is adequate based at least in part on whether the LBT sensing beam includes the several transmit beams, and based at least in part on whether an energy detection threshold ($EDT_0$) satisfies a condition (e.g., $EDT_0 \leq \min_i\{EDT_i\}$).

As indicated above, FIG. 6 is provided as an example. Other examples may differ from what is described with regard to FIG. 6.

Figure 7:
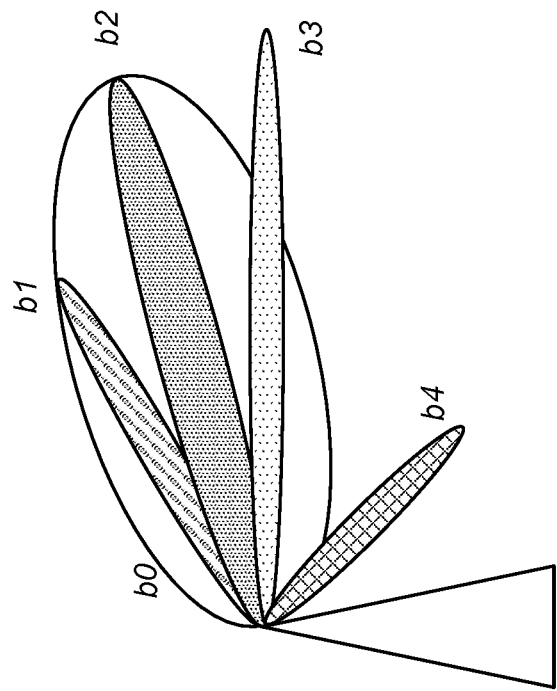
FIG. 7 is a diagram illustrating an example of potential transmit beams, in accordance with the present disclosure.

FIG. 7 is a diagram illustrating an example 700 of potential transmit beams, in accordance with the present disclosure.

As shown in FIG. 7, an LBT sensing beam ($b_0$) may be defined, and a set of desired transmit beams (e.g., $b_1$, $b_2$, $b_3$, and $b_4$) may be evaluated. In this example transmit beam $b_1$ and transmit beam $b_2$ may be eligible transmit beams based at least in part on transmit beam $b_1$ and transmit beam $b_2$ being included in the LBT sensing beam ($b_0$) and based at least in part on energy detection thresholds associated with the LBT sensing beam ($b_0$) in relation to the transmit beam $b_1$ and the transmit beam $b_2$, respectively. Further, the transmit beam $b_3$ may not be an eligible transmit beam because the LBT sensing beam ($b_0$) may not be adequate for the transmit beam $b_3$ (e.g., based at least in part on an energy detection threshold. Further, the transmit beam $b_4$ may not be an eligible transmit beam based at least in part on the transmit beam $b_4$ not being included in the LBT sensing beam ($b_0$).

As indicated above, FIG. 7 is provided as an example. Other examples may differ from what is described with regard to FIG. 7.

In a region in which LBT is employed, contention-free transmissions may be allowed for control signaling for up to 10 ms over a 100 ms window. In the 60 GHz band, arbitrary pauses or gaps in transmission may be allowed over a COT. Due to an availability of an arbitrary pause, transmissions may not be mandated to start immediately after a channel sensing of the LBT. The arbitrary pauses may be allowed because in a CCA procedure, there may be no requirement on how long a pause should be between an initiating device and responding device transmissions. In contrast, in FR1, after an LBT, a channel occupancy time may begin immediately after the LBT (e.g., no pause).

In the 60 GHz band, an effect of these arbitrary pauses may be undefined for directional LBT having a wide sensing beam and several, narrower transmit beams (e.g., the transmit beams may be narrower than the wide sensing beam). For example, the effect of these arbitrary pauses may be undefined with respect to a start of the COT, a start of a timer towards a maximum channel occupancy time (MCOT) after a completion of the LBT, a COT claiming signal, and/or transmissions that are considered eligible to claim the COT. As a result, a transmitting node may not be configured to start or initiate a COT after a directional LBT or a sequence of directional LBTs based at least in part on an arbitrary pause, where each directional LBT may cover more than one transmit beam.

In various aspects of techniques and apparatuses described herein, a transmitting node may perform a directional LBT using a sensing beam. The transmitting node may start a COT after the directional LBT based at least in part on a COT claiming signal or a time stamp. In some aspects, the transmitting node may start the COT by transmitting the COT claiming signal. The transmitting node may transmit the COT claiming signal using the sensing beam associated with the directional LBT. Alternatively, the transmitting node may transmit the COT claiming signal using a transmit beam selected from the one or more transmit beams that are included in the sensing beam. In some aspects, the transmitting node may start the COT based at least in part on the time stamp, where the time stamp may correspond to a start of a pause. The start of the pause may correspond to an end of the directional LBT and a start of the COT. The time stamp may indicate the start of the COT in place of the COT claiming signal. In some aspects, the transmitting node may perform, to a receiving node, one or more transmissions during the COT using one or more transmit beams that are included in the sensing beam. As a result, the transmitting node may start the COT after the directional LBT, and the start of the COT may be based at least in part on the pause which may be allowed in the 60 GHz band.

Figure 8:
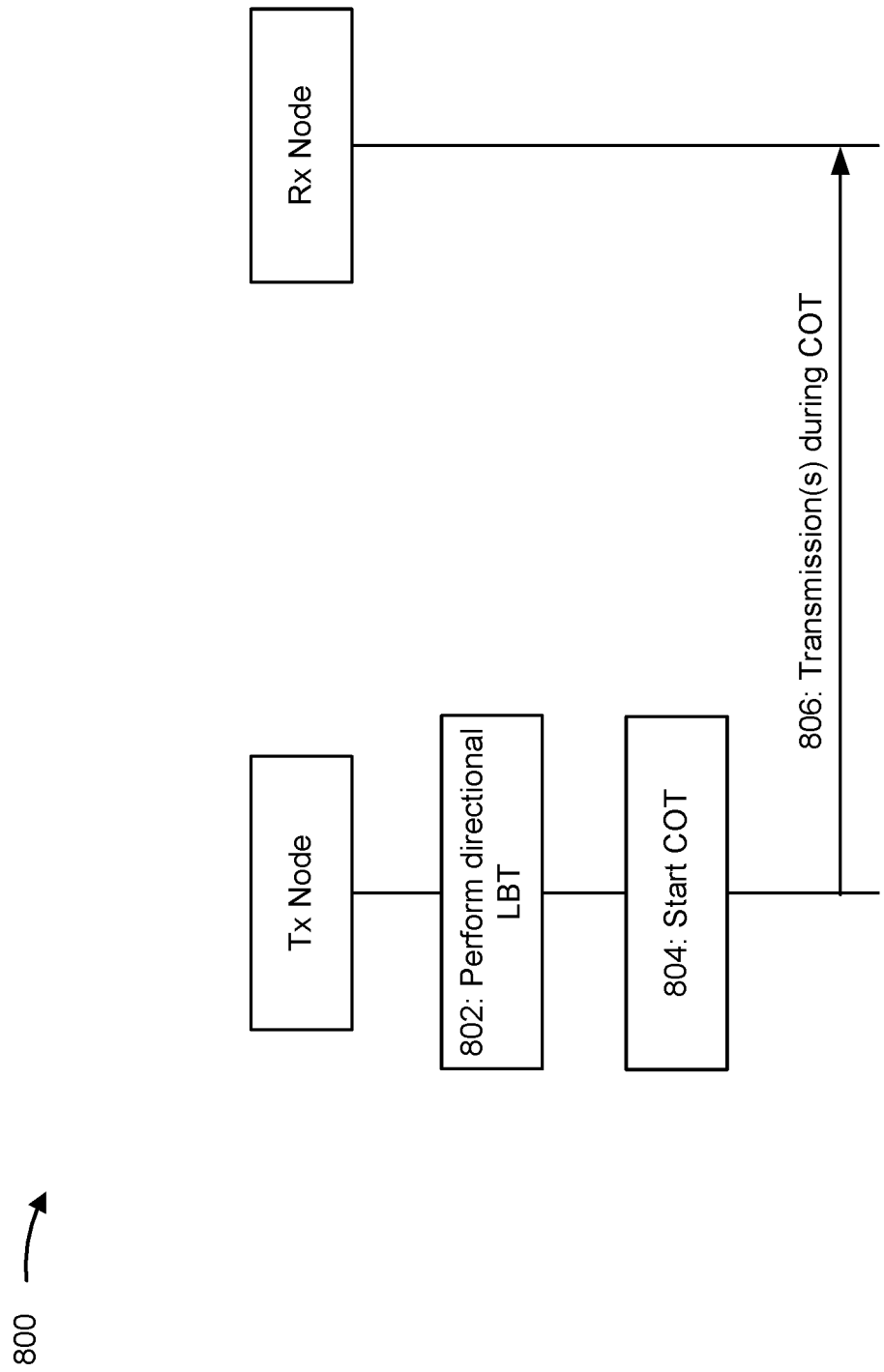
FIGS. 8-13 are diagrams illustrating examples associated with starting a COT after a directional LBT, in accordance with the present disclosure.

FIG. 8 is a diagram illustrating an example 800 associated with starting a COT after a directional LBT, in accordance with the present disclosure. As shown in FIG. 8, example 800 includes communication between a transmitting node (e.g., UE 120 or base station 110) and a receiving node (e.g., base station 110 or UE 120). In some aspects, the transmitting node and the receiving node may be included in a wireless network such as wireless network 100.

As shown by reference number 802, the transmitting node may perform a directional LBT using a sensing beam. A "directional LBT" may be an LBT that is performed in a specific direction, as opposed to an omni-directional LBT. The directional LBT may be performed using a relatively wide sensing beam that covers multiple transmit beams.

As shown by reference number 804, the transmitting node may start a COT after the directional LBT. The transmitting node may start the COT when a channel is sensed to be available based at least in part on the directional LBT. The transmitting node may start the COT in order to perform transmissions during the COT.

In some aspects, the transmitting node may start the COT based at least in part on a COT claiming signal. The "COT claiming signal" may be a signal transmitted to indicate to other nodes that the channel may be shared with the other nodes. The transmitting node may transmit the COT claiming signal to start the COT. In other words, the start of the COT may be triggered based at least in part on a transmission of the COT claiming signal. In some aspects, the transmitting node may transmit the COT claiming signal using the sensing beam associated with the directional LBT. In other words, a beam used to transmit the COT claiming signal may correspond to a beam used to perform the directional LBT. In some aspects, the transmitting node may transmit the COT claiming signal using a transmit beam selected from one or more transmit beams that are included in the sensing beam. In other words, a beam used to transmit the COT claiming signal may be included in a beam used to perform the directional LBT.

In some aspects, the transmitting node may start the COT based at least in part on a time stamp. The transmitting node may mark the time stamp at a start of a pause. The start of the pause may correspond to an end of the directional LBT and a start of the COT. In other words, at the end of the directional LBT, the transmitting node may mark the time stamp to start the COT. However, the transmitting node may not transmit during the pause. Rather, the transmitting node may wait for a period of time before performing transmissions.

As shown by reference number 806, the transmitting node may perform, to a receiving node, one or more transmissions during the COT using one or more transmit beams that are included in the sensing beam. The one or more transmit beams may be narrower than the sensing beam since the one or more transmit beams may be included in the sensing beam. The transmitting node may start performing the one or more transmissions using the one or more transmit beams after the pause. Further, the pause and the one or more transmissions using the one or more transmit beams may occur within a maximum channel occupancy time associated with the COT.

In some aspects, a transmit beam included in the one or more transmit beams may be eligible based at least in part on the transmit beam being included in the sensing beam, and based at least in part on the transmit beam being associated with an energy detection threshold that is greater than or equal to an energy detection threshold associated with the sensing beam. In some aspects, the directional LBT may be adequate for transmitting on the one or more transmit beams based at least in part on the sensing beam including the one or more transmit beams, and based at least in part on an energy detection threshold associated with the sensing beam being less than or equal to a minimum energy detection threshold associated with the one or more transmit beams.

As indicated above, FIG. 8 is provided as an example. Other examples may differ from what is described with regard to FIG. 8.

Figure 9:
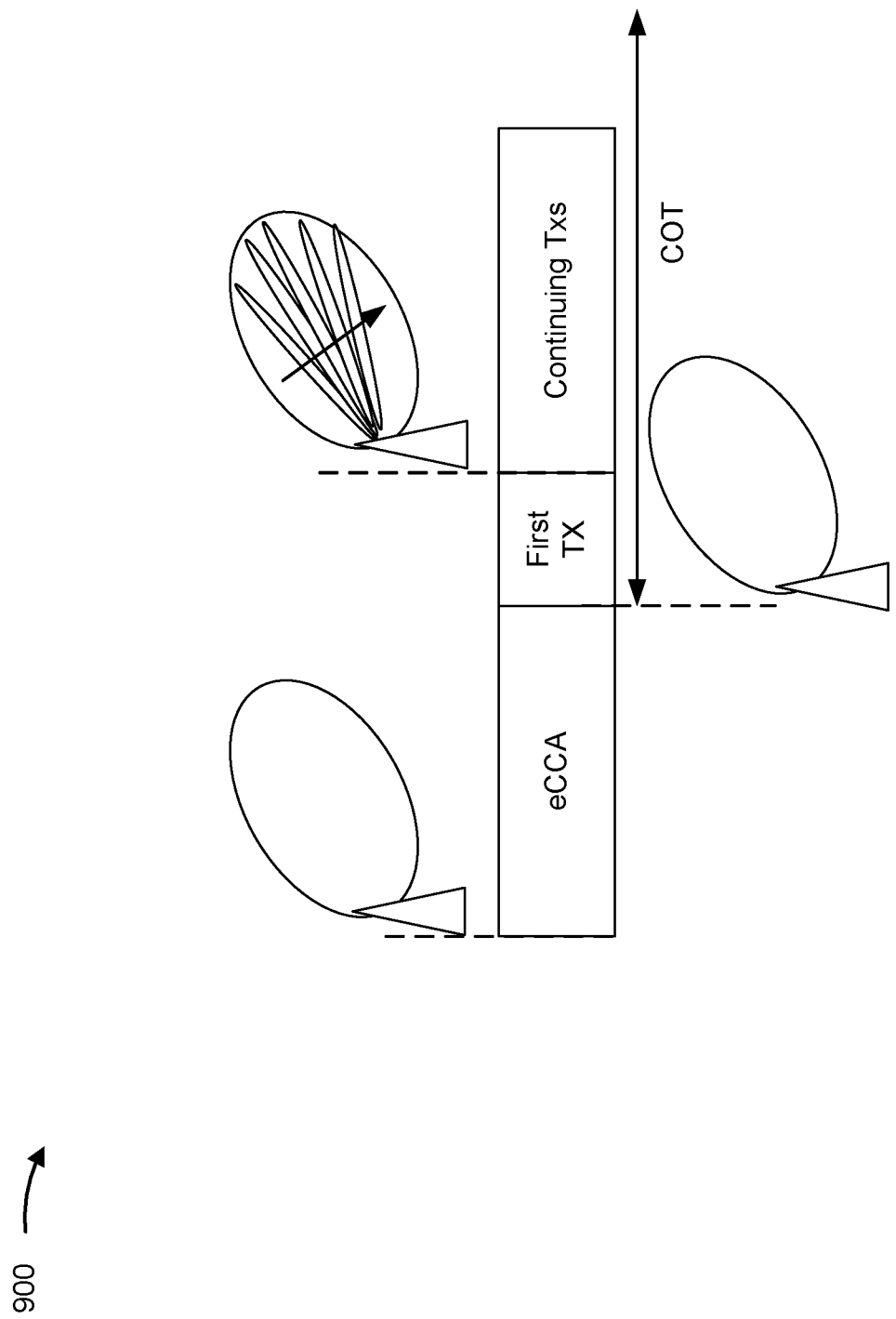

FIG. 9 is a diagram illustrating an example 900 associated with starting a COT after a directional LBT, in accordance with the present disclosure.

As shown in FIG. 9, a transmitting node may perform an LBT during a CCA procedure (or an enhanced CCA procedure). The transmitting node may be an initiating device. The transmitting node may perform the LBT using a wide sensing beam. After performing the LBT on the wide sensing beam, the transmitting node may initiate or start a COT by transmitting a COT claiming signal (or a first transmission). The transmitting node may initiate the COT by transmitting the COT claiming signal on the wide sensing beam. In other words, the transmitting node may start the COT by transmitting a signal on a beam used for sensing. After a COT start has been fulfilled based at least in part on transmitting the COT claiming signal, the transmitting node may perform additional transmissions on eligible transmit beams. The eligible transmit beams may be narrower than the wide sensing beam.

In some aspects, a sensing beam used for LBT may be meant to cover a single desired transmit beam. For a matched sensing beam and transmit beam, an energy detection threshold may be based at least in part on transmit beam parameters in terms of bandwidth and/or an EIRP. However, in some cases, a sensing beam used for LBT may be meant to cover other narrower transmissions, so the matched sensing beam and transmit beam may be unsuitable.

As indicated above, FIG. 9 is provided as an example. Other examples may differ from what is described with regard to FIG. 9.

Figure 10:
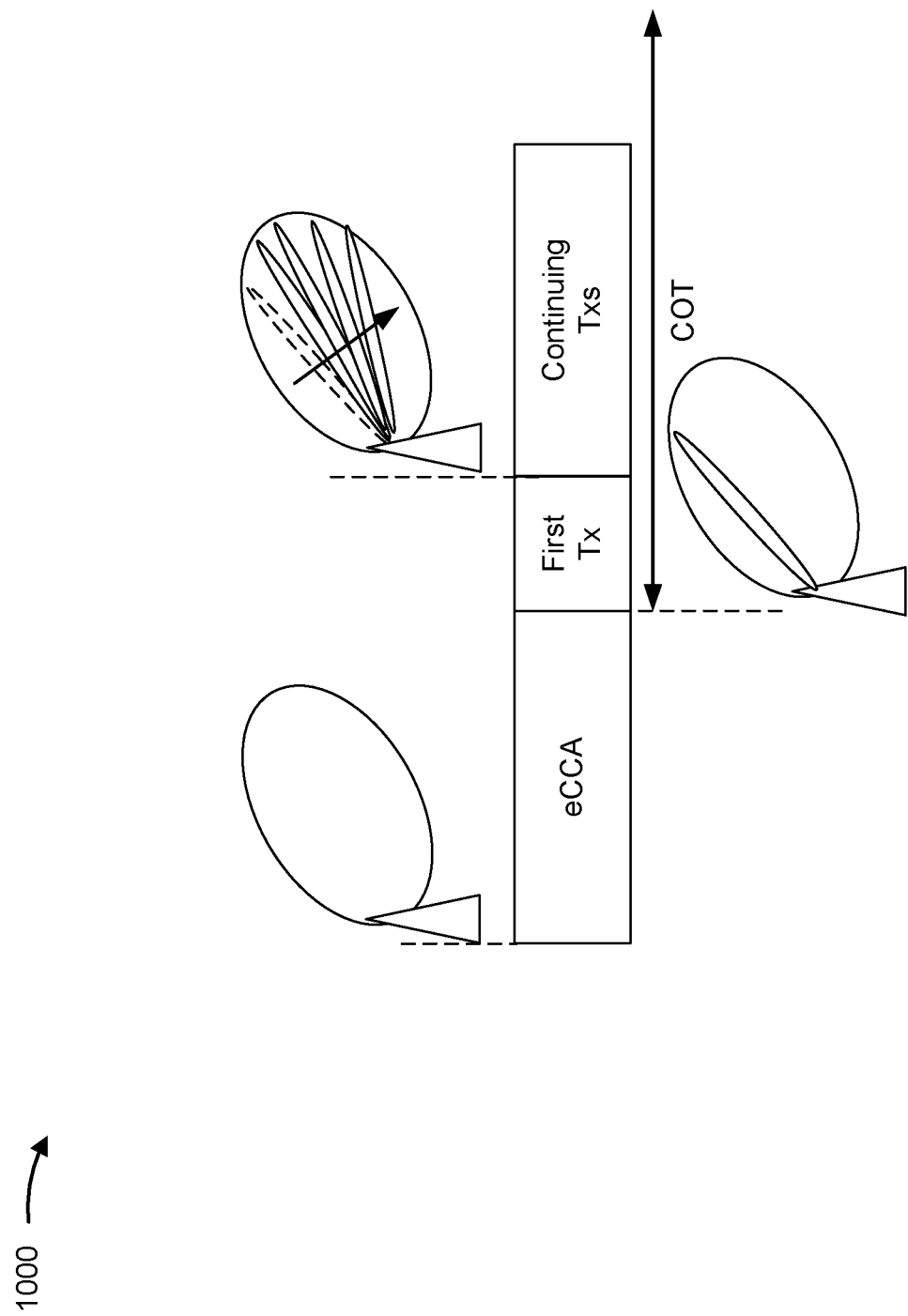

FIG. 10 is a diagram illustrating an example 1000 associated with starting a COT after a directional LBT, in accordance with the present disclosure.

As shown in FIG. 10, a transmitting node may perform an LBT during a CCA procedure (or an enhanced CCA procedure). The transmitting node may be an initiating device. The transmitting node may perform the LBT using a wide sensing beam. After performing the LBT on the wide sensing beam, the transmitting node may initiate or start a COT by transmitting a COT claiming signal (or a first transmission). The transmitting node may initiate the COT by transmitting the COT claiming signal on an eligible transmit beam (e.g., on any of the eligible transmit beams). The eligible transmit beam may be included in the wide sensing beam. In other words, the eligible transmit beam may be narrower than the wide sensing beam. The transmitting node may start the COT by transmitting a signal on a beam that is narrower than a beam used for sensing. After a COT start has been fulfilled based at least in part on transmitting the COT claiming signal, the transmitting node may perform additional transmissions on the eligible transmit beams.

As an example, after an LBT, synchronization signal block (SSB) sweep transmissions may cover SSB beams within an SSB burst. In this example, after a collective LBT is performed, a first SSB beam may be transmitted as a COT claiming signal. Other SSB beams may then be transmitted as the SSB sweep transmissions.

As indicated above, FIG. 10 is provided as an example. Other examples may differ from what is described with regard to FIG. 10.

Figure 11:
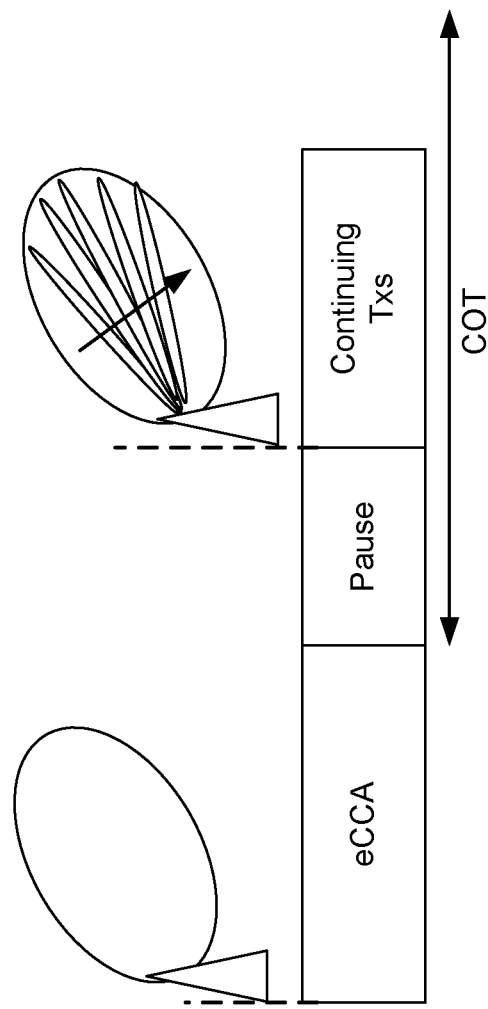

FIG. 11 is a diagram illustrating an example 1100 associated with starting a COT after a directional LBT, in accordance with the present disclosure.

As shown in FIG. 11, a transmitting node may perform an LBT during a CCA procedure (or an enhanced CCA procedure). The transmitting node may be an initiating device. The transmitting node may perform the LBT using a wide sensing beam. After performing the LBT on the wide sensing beam, the transmitting node may mark an end of the directional LBT and a start of a COT with a time stamp. The time stamp may indicate both the end of the directional LBT and the start of the COT. In this case, the transmitting node may initiate the COT based at least in part on marking the time stamp. The transmitting node may defer an initial transmission for a period of time in accordance with a pause. The transmitting node may perform transmissions on eligible transmit beams after the pause and before an end of the COT. The COT may comply with a maximum channel occupancy time (e.g., 5 ms).

In some aspects, the transmitting node may not initiate or start the COT by transmitting a COT claiming signal. The COT may be initiated with a timer without mandating an initial transmission (e.g., a COT claiming signal) to claim the COT. After the LBT, the transmitting node may defer the transmissions on the eligible transmit beams during the pause. After the pause, the transmitting node may perform the transmissions on the eligible transmit beams without transmitting the COT claiming signal.

As indicated above, FIG. 11 is provided as an example. Other examples may differ from what is described with regard to FIG. 11.

Figure 12:
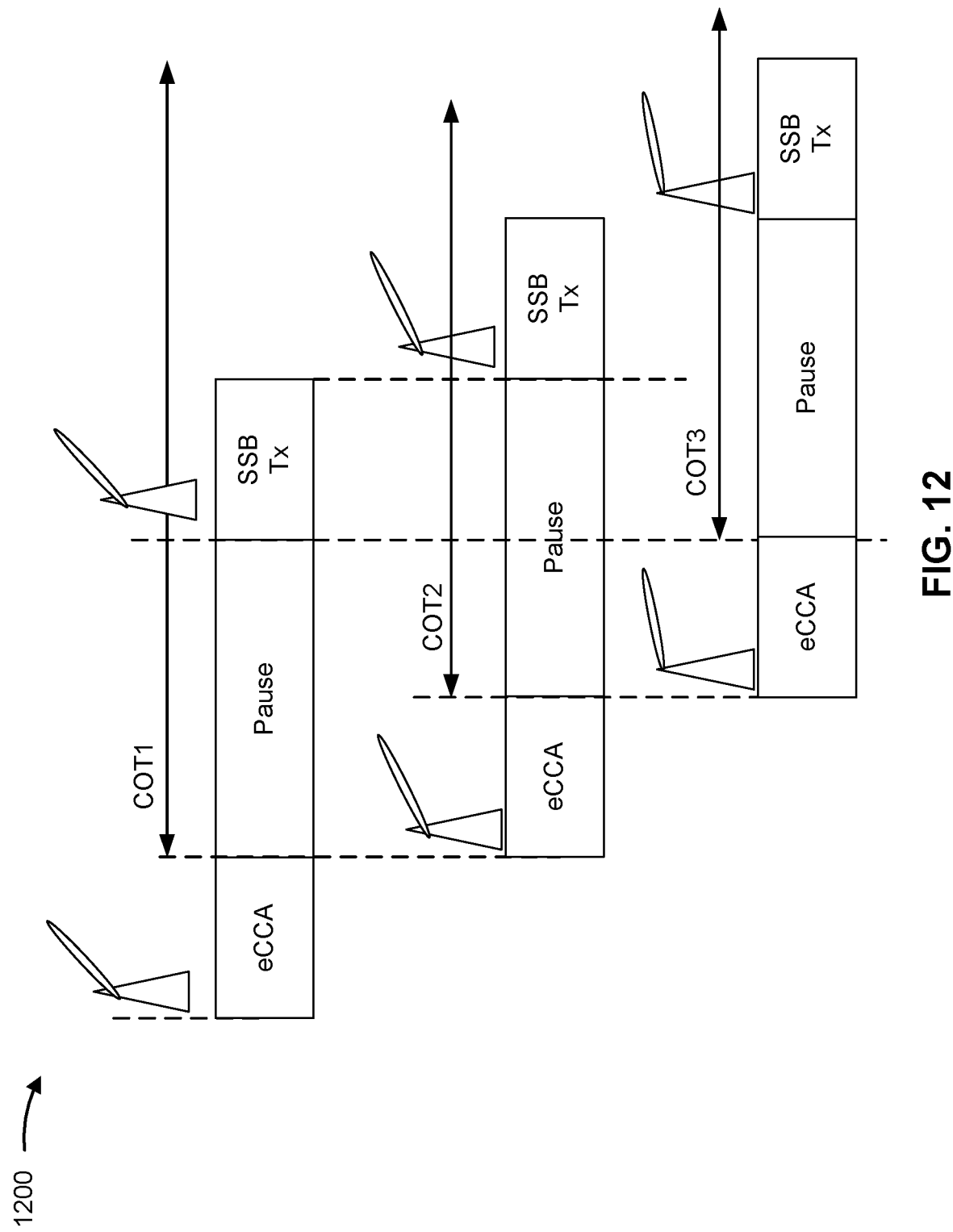

FIG. 12 is a diagram illustrating an example 1200 associated with starting a COT after a directional LBT, in accordance with the present disclosure.

As shown in FIG. 12, a base station may perform an SSB sweep using time division multiplexing after an LBT sweep is performed using time division multiplexing. The base station may perform a single LBT for each SSB to be transmitted. For example, the base station may perform a first LBT for a first SSB, a second LBT for a second SSB, and a third LBT for a third SSB. The base station may perform the first LBT, the second LBT, and the second LBT as part of a first CCA procedure, a second CCA procedure, and a third CCA procedure, respectively. The base station may perform the first LBT, the second LBT, and the second LBT using time division multiplexing. After the first LBT, a first timer may be started to start a first COT with a first pause. After the second LBT, a second timer may be started to start a second COT with a second pause. After the third LBT, a third timer may be started to start a third COT with a third pause. In other words, each separate COT may be started with a timer after each sensing is concluded. The base station may transmit the first SSB after the first pause. The base station may transmit the second SSB after the second pause, and after the transmission of the first SSB. The base station may transmit the third SSB after the third pause, and after the transmission of the second SSB. In other words, the base station may perform SSB transmissions in time division multiplexing, where each SSB transmission may be performed within a respective COT.

As indicated above, FIG. 12 is provided as an example. Other examples may differ from what is described with regard to FIG. 12.

Figure 13:
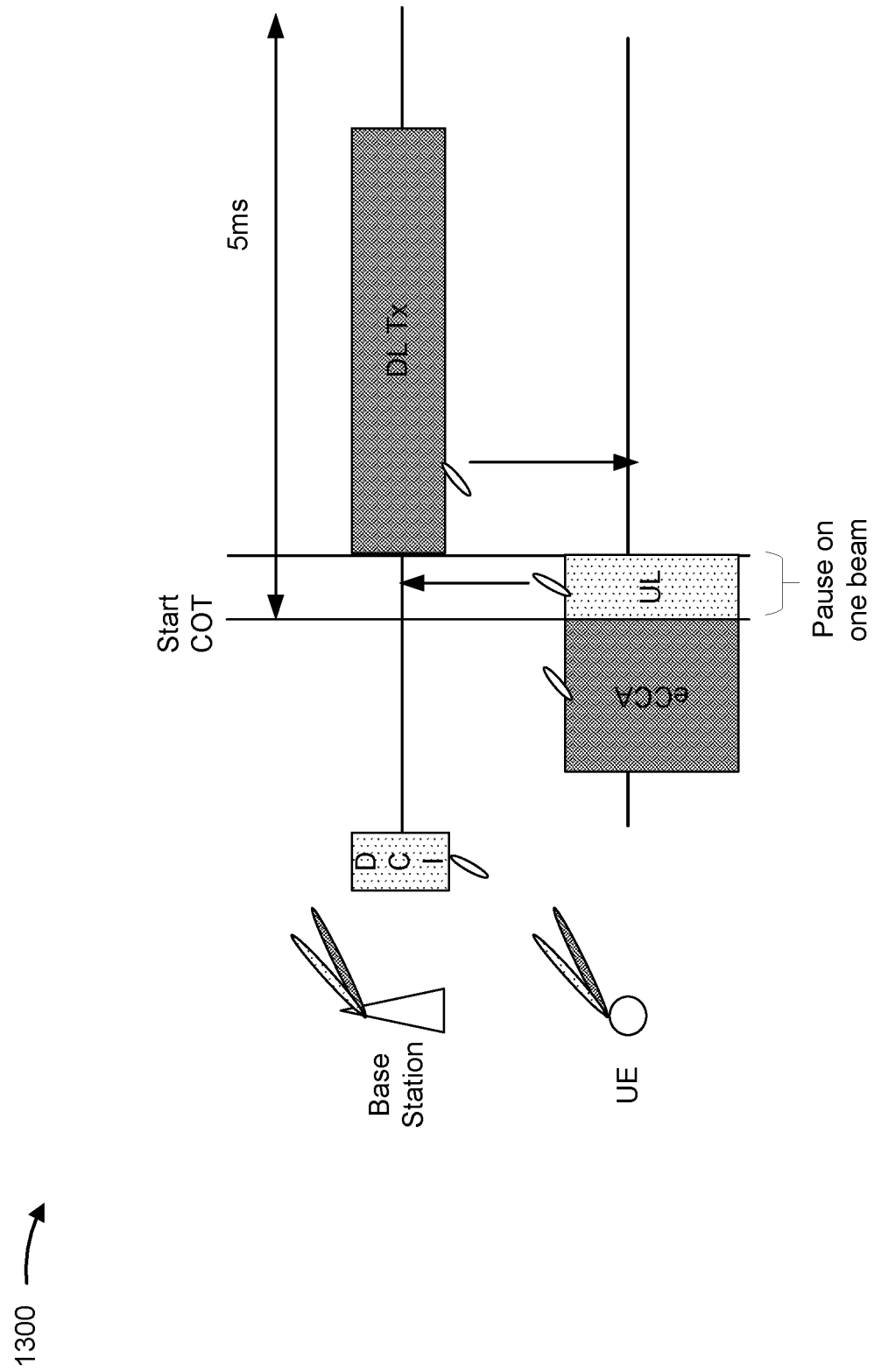

FIG. 13 is a diagram illustrating an example 1300 associated with starting a COT after a directional LBT, in accordance with the present disclosure.

As shown in FIG. 13, for a receiver-assisted LBT, a base station may transmit downlink control information (DCI) to request a UE to perform an LBT on a desired beam. The UE may perform an LBT during a CCA procedure. The UE may perform an uplink transmission to the base station to indicate whether the LBT is successful. The base station may perform a downlink transmission to the UE based at least in part on the uplink transmission. The DCI and the uplink transmission may be performed using resources that are separate from resources associated with performing the LBT and the downlink transmission. In other words, the base station may transmit the DCI and the UE may perform the uplink transmission using corresponding beams, and the UE may perform the LBT and the base station may perform the downlink transmission using corresponding beams. The uplink transmission may be performed using short control signaling and does not necessarily need to undergo LBT. Further, after the LBT, the UE may mark a time stamp to start a COT. The UE may start the COT without transmitting a COT claiming signal. The start of the COT may coincide with a pause. Since the uplink transmission is performed on a different beam as compared to the LBT, the uplink transmission may be considered to be performed during the pause. The downlink transmission that is performed using a different beam/resource as compared to the uplink transmission may be performed after the pause.

As indicated above, FIG. 13 is provided as an example. Other examples may differ from what is described with regard to FIG. 13.

Figure 14:
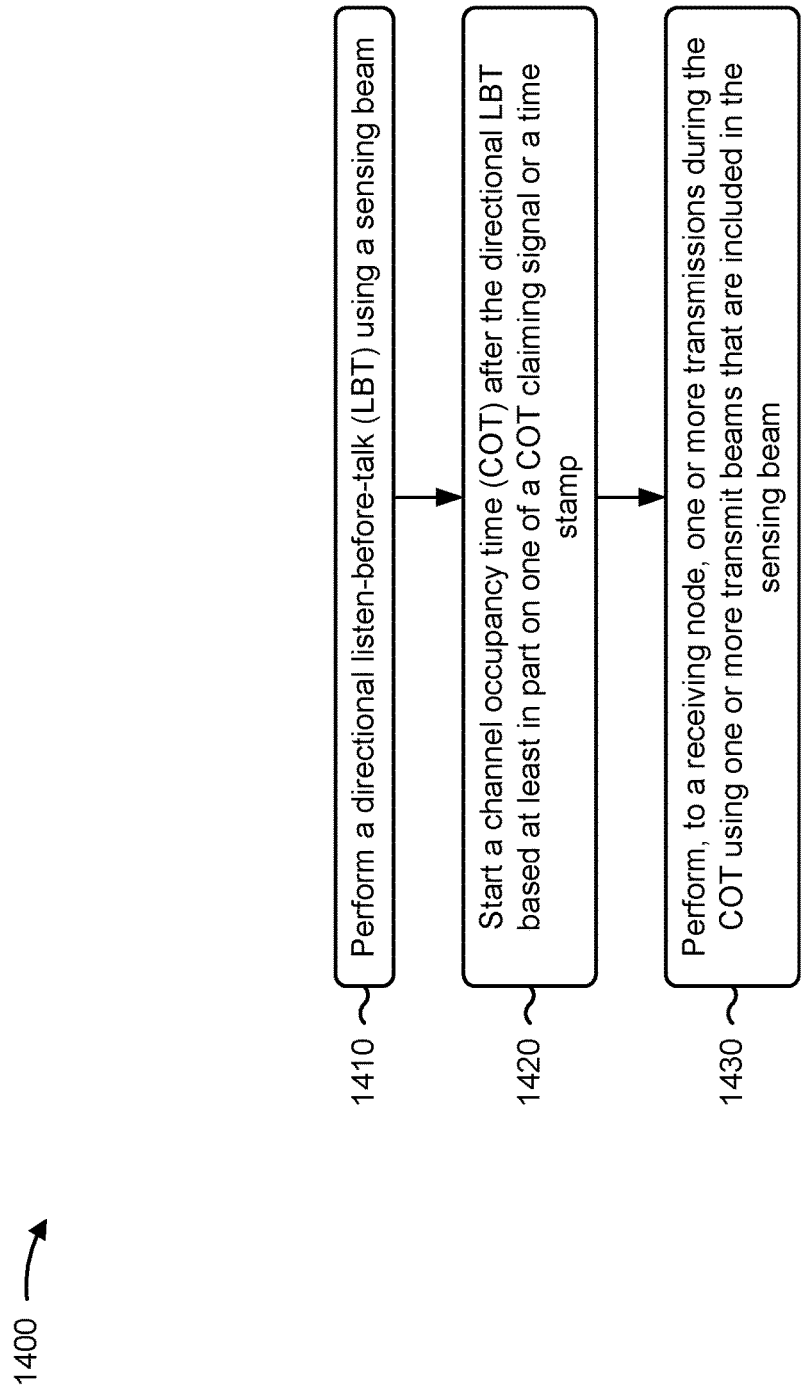
FIG. 14 is a diagram illustrating an example process associated with starting a COT after a directional LBT, in accordance with the present disclosure.

FIG. 14 is a diagram illustrating an example process 1400 performed, for example, by a transmitting node, in accordance with the present disclosure. Example process 1400 is an example where the transmitting node (e.g., base station 110 or UE 120) performs operations associated with starting a COT after a directional LBT.

As shown in FIG. 14, in some aspects, process 1400 may include performing a directional LBT using a sensing beam (block 1410). For example, the transmitting node (e.g., using performance component 1508, depicted in FIG. 15) may perform a directional LBT using a sensing beam, as described above.

As further shown in FIG. 14, in some aspects, process 1400 may include starting a COT after the directional LBT based at least in part on one of a COT claiming signal or a time stamp (block 1420). For example, the transmitting node (e.g., using initiation component 1510, depicted in FIG. 15) may start a COT after the directional LBT based at least in part on one of a COT claiming signal or a time stamp, as described above.

As further shown in FIG. 14, in some aspects, process 1400 may include performing, to a receiving node, one or more transmissions during the COT using one or more transmit beams that are included in the sensing beam (block 1430). For example, the transmitting node (e.g., using transmission component 1504, depicted in FIG. 15) may perform, to a receiving node, one or more transmissions during the COT using one or more transmit beams that are included in the sensing beam, as described above.

Process 1400 may include additional aspects, such as any single aspect or any combination of aspects described below and/or in connection with one or more other processes described elsewhere herein.

In a first aspect, starting the COT is based at least in part on transmitting the COT claiming signal.

In a second aspect, alone or in combination with the first aspect, the COT claiming signal is transmitted using the sensing beam associated with the directional LBT.

In a third aspect, alone or in combination with one or more of the first and second aspects, the COT claiming signal is transmitted using a transmit beam selected from the one or more transmit beams that are included in the sensing beam.

In a fourth aspect, alone or in combination with one or more of the first through third aspects, starting the COT is based at least in part on the time stamp corresponding to a start of a pause, wherein the start of the pause corresponds to an end of the directional LBT and a start of the COT.

In a fifth aspect, alone or in combination with one or more of the first through fourth aspects, the one or more transmissions using the one or more transmit beams are started after the pause.

In a sixth aspect, alone or in combination with one or more of the first through fifth aspects, the pause and the one or more transmissions using the one or more transmit beams occur within a maximum channel occupancy time associated with the COT.

In a seventh aspect, alone or in combination with one or more of the first through sixth aspects, the time stamp indicates the start of the COT in place of the COT claiming signal.

In an eighth aspect, alone or in combination with one or more of the first through seventh aspects, a transmit beam included in the one or more transmit beams is eligible based at least in part on the transmit beam being included in the sensing beam, and based at least in part on the transmit beam being associated with an energy detection threshold that is greater than or equal to an energy detection threshold associated with the sensing beam.

In a ninth aspect, alone or in combination with one or more of the first through eighth aspects, the directional LBT is adequate for transmitting on the one or more transmit beams based at least in part on the sensing beam including the one or more transmit beams, and based at least in part on an energy detection threshold associated with the sensing beam being less than or equal to a minimum energy detection threshold associated with the one or more transmit beams.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
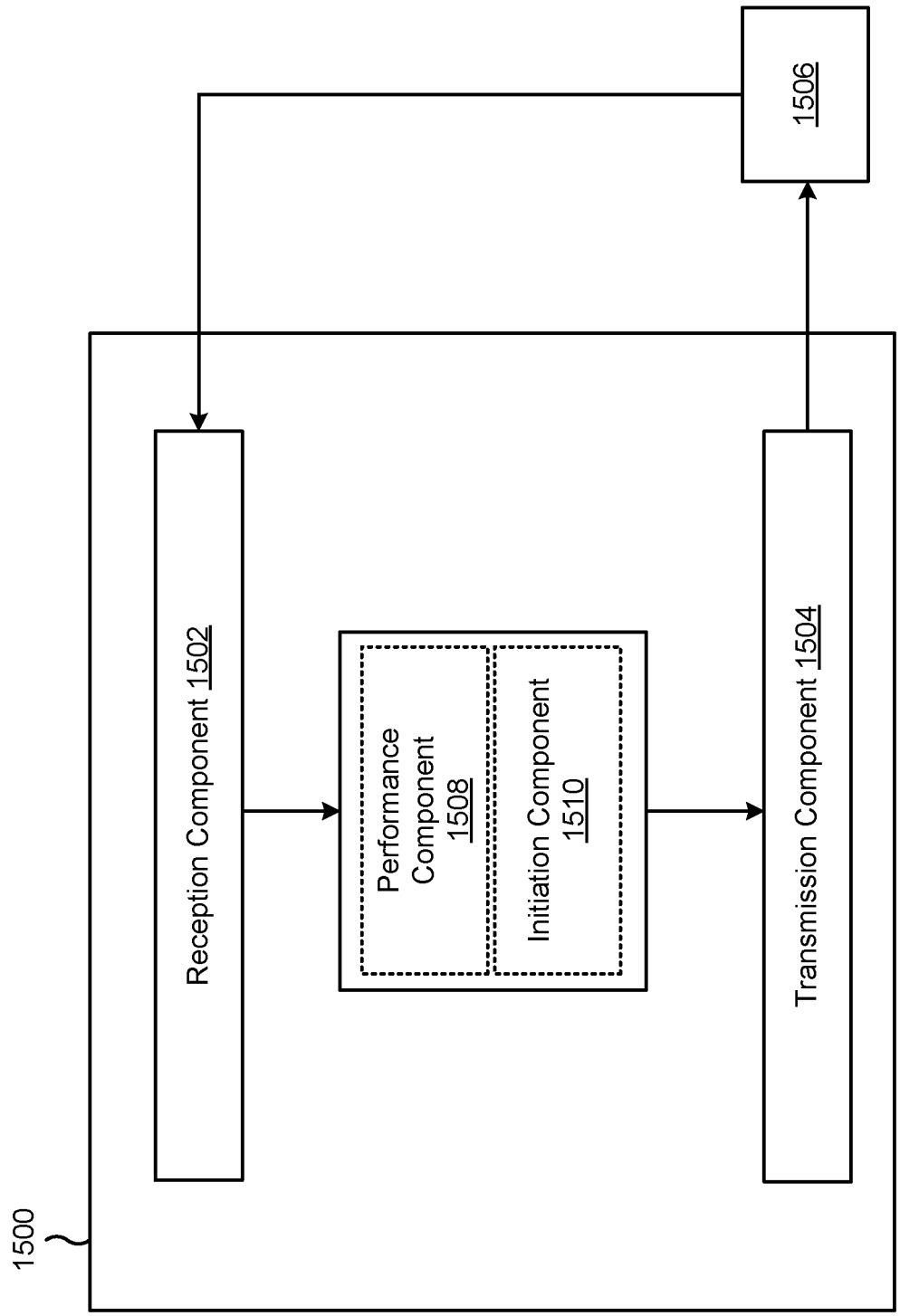
FIG. 15 is a block diagram of an example apparatus for wireless communication, in accordance with the present disclosure.

FIG. 15 is a block diagram of an example apparatus 1500 for wireless communication. The apparatus 1500 may be a transmitting node, or a transmitting node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include one or more of a performance component 1508, or an initiation component 1510, among other examples.

In some aspects, the apparatus 1500 may be configured to perform one or more operations described herein in connection with FIGS. 8-13. Additionally, or alternatively, the apparatus 1500 may be configured to perform one or more processes described herein, such as process 1400 of FIG. 14. In some aspects, the apparatus 1500 and/or one or more components shown in FIG. 15 may include one or more components of the transmitting node described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the transmitting node described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the transmitting node described above in connection with FIG. 2. In some aspects, the transmission component 1504 may be co-located with the reception component 1502 in a transceiver.

The performance component 1508 may perform a directional LBT using a sensing beam. The initiation component 1510 may start a COT after the directional LBT based at least in part on one of a COT claiming signal or a time stamp. The transmission component 1504 may perform, to a receiving node, one or more transmissions during the COT using one or more transmit beams that are included in the sensing beam.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a transmitting node, comprising: performing a directional listen-before-talk (LBT) using a sensing beam; starting a channel occupancy time (COT) after the directional LBT based at least in part on one of a COT claiming signal or a time stamp; and performing, to a receiving node, one or more transmissions during the COT using one or more transmit beams that are included in the sensing beam.

Aspect 2: The method of Aspect 1, wherein starting the COT is based at least in part on transmitting the COT claiming signal.

Aspect 3: The method of Aspect 2, wherein the COT claiming signal is transmitted using the sensing beam associated with the directional LBT.

Aspect 4: The method of Aspect 2, wherein the COT claiming signal is transmitted using a transmit beam selected from the one or more transmit beams that are included in the sensing beam.

Aspect 5: The method of any of Aspects 1 through 4, wherein starting the COT is based at least in part on the time stamp corresponding to a start of a pause, wherein the start of the pause corresponds to an end of the directional LBT and a start of the COT.

Aspect 6: The method of Aspect 5, wherein the one or more transmissions using the one or more transmit beams are started after the pause.

Aspect 7: The method of Aspect 5, wherein the pause and the one or more transmissions using the one or more transmit beams occur within a maximum channel occupancy time associated with the COT.

Aspect 8: The method of Aspect 5, wherein the time stamp indicates the start of the COT in place of the COT claiming signal.

Aspect 9: The method of any of Aspects 1 through 8, wherein a transmit beam included in the one or more transmit beams is eligible based at least in part on the transmit beam being included in the sensing beam, and based at least in part on the transmit beam being associated with an energy detection threshold that is greater than or equal to an energy detection threshold associated with the sensing beam.

Aspect 10: The method of any of Aspects 1 through 9, wherein the directional LBT is adequate for transmitting on the one or more transmit beams based at least in part on the sensing beam including the one or more transmit beams, and based at least in part on an energy detection threshold associated with the sensing beam being less than or equal to a minimum energy detection threshold associated with the one or more transmit beams.

Aspect 11: An apparatus for wireless communication at a device, comprising a processor; memory coupled with the processor; and instructions stored in the memory and executable by the processor to cause the apparatus to perform the method of one or more of Aspects 1-10.

Aspect 12: A device for wireless communication, comprising a memory and one or more processors coupled to the memory, the memory and the one or more processors configured to perform the method of one or more of Aspects 1-10.

Aspect 13: An apparatus for wireless communication, comprising at least one means for performing the method of one or more of Aspects 1-10.

Aspect 14: A non-transitory computer-readable medium storing code for wireless communication, the code comprising instructions executable by a processor to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transmitting node for wireless communication, comprising:
   one or more memories comprising processor-executable instructions; and
   one or more processors, configured to execute the processor-executable instructions and cause the transmitting node to:
   perform a directional listen-before-talk (LBT) using a sensing beam;
   transmit a channel occupancy time (COT) claiming signal, after the directional LBT, wherein the transmission of the COT claiming signal starts a COT and indicates that a channel, associated with the COT, is shareable; and
   perform, to a receiving node, one or more transmissions during the COT using one or more transmit beams that are included in the sensing beam.

2. The transmitting node of claim 1, wherein the one or more processors, to start the COT, are further configured to cause the transmitting node to transmit the COT claiming signal.

3. The transmitting node of claim 1, wherein the one or more processors are further configured to cause the transmitting node to transmit the COT claiming signal using the sensing beam.

4. The transmitting node of claim 1, wherein the one or more processors are further configured to cause the transmitting node to transmit the COT claiming signal using a transmit beam selected from the one or more transmit beams that are included in the sensing beam.

5. The transmitting node of claim 1, wherein a transmit beam included in the one or more transmit beams is eligible based at least in part on the transmit beam being included in the sensing beam.

6. The transmitting node of claim 1, wherein a transmit beam included in the one or more transmit beams is eligible based at least in part on the transmit beam being associated with an energy detection threshold that is greater than or equal to an energy detection threshold associated with the sensing beam.

7. The transmitting node of claim 1, wherein the directional LBT is adequate for transmitting on the one or more transmit beams based at least in part on the sensing beam including the one or more transmit beams.

8. The transmitting node of claim 1, wherein the directional LBT is adequate for transmitting on the one or more transmit beams based at least in part on an energy detection threshold associated with the sensing beam being less than or equal to a minimum energy detection threshold associated with the one or more transmit beams.

9. A method of wireless communication performed by a transmitting node, comprising:
   performing a directional listen-before-talk (LBT) using a sensing beam;
   transmitting a channel occupancy time (COT) claiming signal, after the directional LBT, wherein the transmission of the COT claiming signal starts a COT and indicates that a channel, associated with the COT, is shareable; and
   performing, to a receiving node, one or more transmissions during the COT using one or more transmit beams that are included in the sensing beam.

10. The method of claim 9, wherein starting the COT is based at least in part on transmitting the COT claiming signal.

11. The method of claim 9, wherein the COT claiming signal is transmitted using the sensing beam.

12. The method of claim 9, wherein the COT claiming signal is transmitted using a transmit beam selected from the one or more transmit beams that are included in the sensing beam.

13. The method of claim 9, wherein a transmit beam included in the one or more transmit beams is eligible based at least in part on the transmit beam being included in the sensing beam.

14. The method of claim 9, wherein a transmit beam included in the one or more transmit beams is eligible based at least in part on the transmit beam being associated with an energy detection threshold that is greater than or equal to an energy detection threshold associated with the sensing beam.

15. The method of claim 9, wherein the directional LBT is adequate for transmitting on the one or more transmit beams based at least in part on the sensing beam including the one or more transmit beams.

16. The method of claim 9, wherein the directional LBT is adequate for transmitting on the one or more transmit beams based at least in part on an energy detection threshold associated with the sensing beam being less than or equal to a minimum energy detection threshold associated with the one or more transmit beams.

17. A non-transitory computer-readable medium storing a set of instructions for wireless communication, the set of instructions comprising:
   one or more instructions that, when executed by one or more processors of a transmitting node, cause the transmitting node to:

perform a directional listen-before-talk (LBT) using a sensing beam;

transmit a channel occupancy time (COT) claiming signal, after the directional LBT, wherein the transmission of the COT claiming signal starts a COT and indicates that a channel, associated with the COT, is shareable; and perform, to a receiving node, one or more transmissions during the COT using one or more transmit beams that are included in the sensing beam.

18. The non-transitory computer-readable medium of claim 17, wherein the one or more instructions, when starting the COT, cause the transmitting node to transmit the COT claiming signal.

19. The non-transitory computer-readable medium of claim 17, wherein the COT claiming signal is transmitted using the sensing beam associated with the directional LBT or using a transmit beam selected from the one or more transmit beams that are included in the sensing beam.

20. The non-transitory computer-readable medium of claim 17, wherein a transmit beam included in the one or more transmit beams is eligible based at least in part on the transmit beam being included in the sensing beam or based at least in part on the transmit beam being associated with an energy detection threshold that is greater than or equal to an energy detection threshold associated with the sensing beam.

* * * * *